(12) United States Patent
Budd et al.

(10) Patent No.: US 9,376,065 B2
(45) Date of Patent: Jun. 28, 2016

(54) ANCHOR ON A LOAD CARRIER FOR A BICYCLE THROUGH-AXLE

(71) Applicant: Thule Sweden AB, Hillerstorp (SE)

(72) Inventors: David Budd, Newton, CT (US); James Paul Detweiler, Bristol, CT (US); Thomas J. Hanson, Rye, NY (US); Ash Patel, Newtown, CT (US); Gregor G. Weaver, Waterbury, CT (US)

(73) Assignee: Thule Sweden AB, Hillerstorp (SE)

( * ) Notice: Subject to any disclaimer, the term of this patent is extended or adjusted under 35 U.S.C. 154(b) by 45 days.

(21) Appl. No.: 14/341,524

(22) Filed: Jul. 25, 2014

(65) Prior Publication Data
US 2015/0028076 A1 Jan. 29, 2015

Related U.S. Application Data

(60) Provisional application No. 61/859,085, filed on Jul. 26, 2013.

(51) Int. Cl.
B60R 9/08 (2006.01)
B60R 9/10 (2006.01)

(52) U.S. Cl.
CPC .......................... B60R 9/10 (2013.01)

(58) Field of Classification Search
CPC ..................... B60R 9/10; B60R 9/08
See application file for complete search history.

(56) References Cited

U.S. PATENT DOCUMENTS

| 764,774 | A | * | 7/1904 | Sargeant | B62H 3/12 211/18 |
|---|---|---|---|---|---|
| 4,629,104 | A | | 12/1986 | Jacquet | |
| 5,417,629 | A | | 5/1995 | Phipps | |
| 5,598,959 | A | * | 2/1997 | Lorensen | B60R 9/045 224/315 |
| 5,875,947 | A | | 3/1999 | Noel et al. | |
| 6,494,351 | B1 | * | 12/2002 | Dean | B60R 9/048 224/324 |
| 6,758,380 | B1 | | 7/2004 | Kolda | |
| 6,851,590 | B2 | | 2/2005 | Dean | |
| 6,913,234 | B2 | | 7/2005 | Weiss | |

(Continued)

FOREIGN PATENT DOCUMENTS

| EP | 2292471 | 3/2011 |
|---|---|---|
| FR | 2332155 | 6/1977 |
| WO | 2008124069 | 10/2008 |

OTHER PUBLICATIONS

DE-STA-CO-Clamps-Products; published Jul. 17, 2013; http://intranet.destaco.com/greng/products.asp?loc=&products=Clamps&lang=&Category_1=Straight+line+Action+Clamps&Category_2=DE-STA_CO%AE+Toggle+Lock+Plus.
Irwin Locking Wrench; Irwin 7 LW Locking Wrench-4 at The Home Depot; http://www.homedepot.com/p/Irwin-7LW-Locking-Wrench-4/100168065; retrieved on Jul. 16, 2013.
Golf Saving network; Golf Club Quick Clamp Vise Shaft Grip Remover Puller Gold Saving Network; http:www.golfsavingsnetwork.com/?p=409; retrieved on Jul. 16, 2013.

(Continued)

Primary Examiner — Brian D Nash
(74) Attorney, Agent, or Firm — Sterne, Kessler, Goldstein & Fox P.L.L.C.

(57) ABSTRACT

An anchor for releasably securing a bicycle through-axle, that is installed in a wheelless front fork of a bicycle, to a load carrier. The anchor is made up of an anchor body having a through-axle receiving space for receiving a bicycle through-axle therein. The anchor additionally has a movable wedge located within the anchor body and transitionable between a receiving configuration in which an interior of the receiving space is expanded for insertably receiving a bicycle through-axle therein, and a secured configuration in which the movable wedge is in lateral abutting engagement with a bicycle through-axle received within the interior of the receiving space.

22 Claims, 13 Drawing Sheets

(56) References Cited

U.S. PATENT DOCUMENTS

| | | | |
|---|---|---|---|
| 7,481,344 B2 * | 1/2009 | Naslund | B60R 9/048 224/319 |
| 7,815,083 B2 * | 10/2010 | Clausen | B60R 9/06 224/497 |
| 7,922,246 B2 | 4/2011 | Gale et al. | |
| 8,136,709 B2 | 3/2012 | Jeli et al. | |
| 8,196,789 B2 | 6/2012 | Kraeuter et al. | |
| 8,282,055 B2 | 10/2012 | Burklin | |
| 8,403,280 B2 | 3/2013 | Halverson et al. | |
| 2003/0080267 A1 | 5/2003 | Eslick | |
| 2007/0210127 A1 | 9/2007 | Book et al. | |
| 2010/0314517 A1 | 12/2010 | Patzer | |
| 2011/0132946 A1 | 6/2011 | Sautter et al. | |
| 2011/0139841 A1 | 6/2011 | Sautter et al. | |

OTHER PUBLICATIONS

Handy-Age Industrial Co., LTD; Quickly Lever bar Clamp/Vise (HT2300-002), View bar Clamp, Product Details ; http://handyage.en.alibaba.com/products/222809625-200628845/Quickly_Lever_Bar_Clam; retrieved on Jul. 16, 2013.

Irwin Pipe Clamp, 1/2 (224212) at Aubuchon Hardware; http:www.hardwarestore.com/irwin-pipe-clamp-226159.aspx; retrieved Jul. 16, 2013.

English abstract for EP2292471; published on Mar. 9, 2011 and retrieved on May 19, 2014.

English abstract for FR2332155; published on Jun. 17, 1977 and retrieved on May 19, 2014.

* cited by examiner

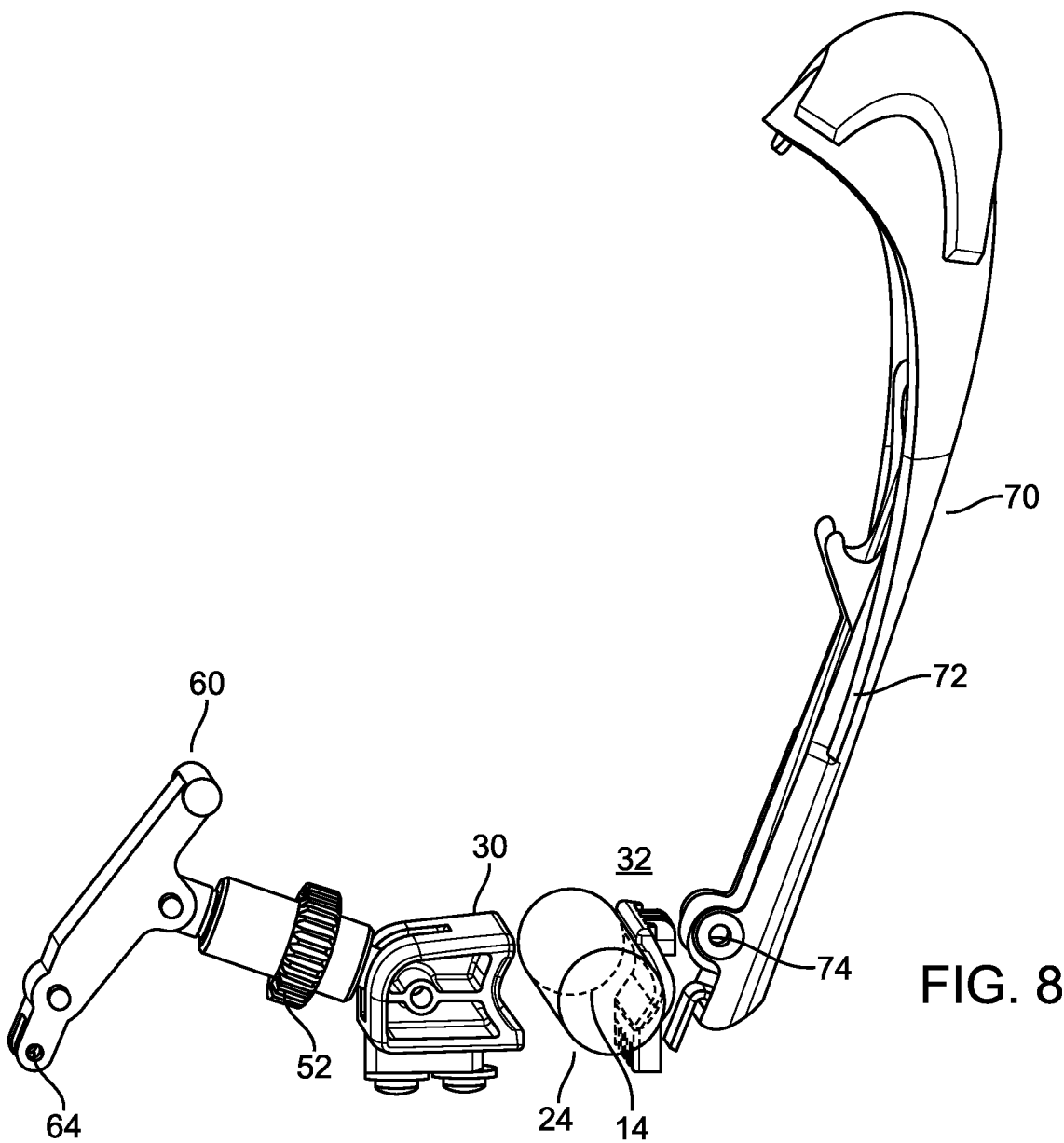

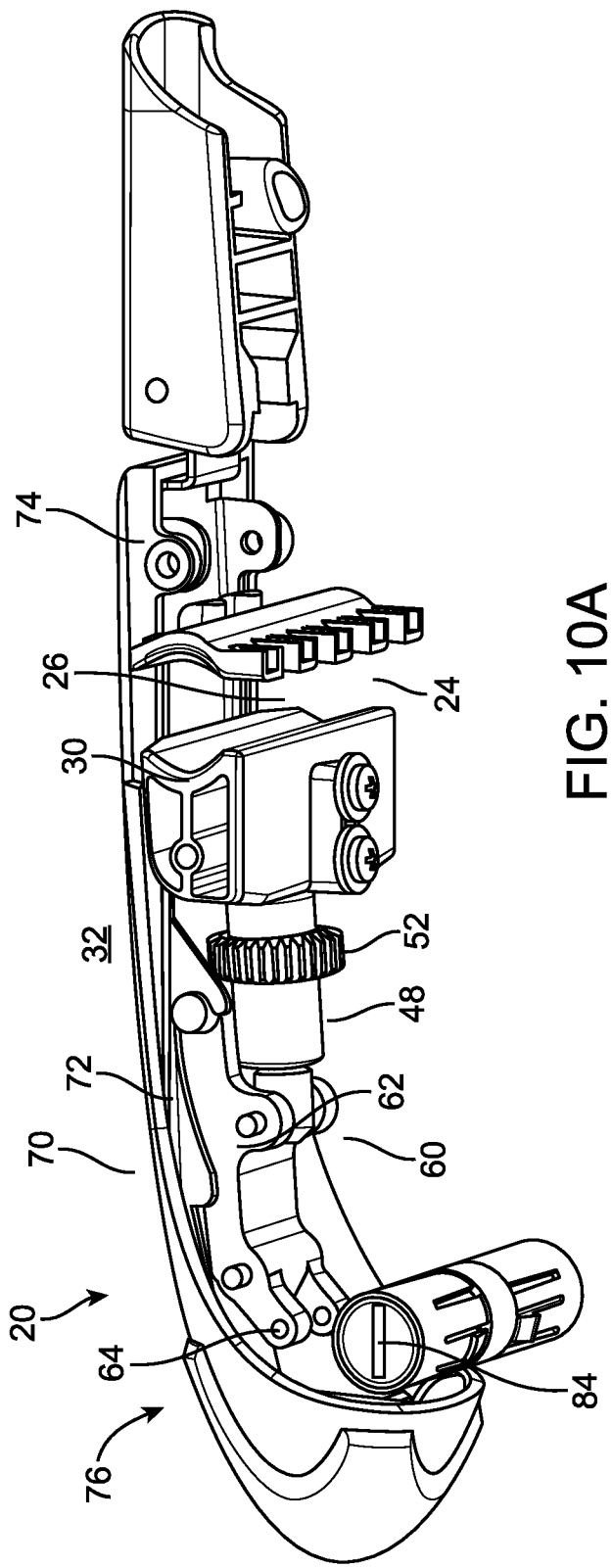

ANCHOR ON A LOAD CARRIER FOR A BICYCLE THROUGH-AXLE

CROSS-REFERENCE TO RELATED APPLICATIONS

This application claims the benefit of U.S. Provisional Application No. 61/859,085, filed Jul. 26, 2013, which is hereby incorporated by reference in its entirety.

FIELD

The releasable engagement of front tires to bicycles using skewers is well-known. Certain designs for bicycle forks, however, have necessitated that the axle upon which the front wheel of the bicycle rotates be fortified. Examples include mountain bikes and other types of bicycles designed to withstand substantial shock forces in the fork which could damage a conventional skewer. Therefore, the through-axle design has been developed for these fortified forks. The through-axle comprises a solid round bar or hollow tube that is received in sleeves, typically at the lower ends of the two legs of the fork, and constituting a hub. Typical sizes of the through-axle are 10 mm, 15 mm and 20 mm installed on hubs that can range in widths from 100 mm to 160 mm.

Vehicular load carriers for bicycles, in at least one type of design, have typically incorporated an anchor in which the skewer that normally secures the front wheel to the bicycle fork is instead used to secure the fork to an anchor that is either positioned upon the load carrier or is made as an integral part of the load carrier. The utilization of through-axle connectors to the forks has thus necessitated a new design for such anchors.

BRIEF DESCRIPTION OF THE DRAWINGS

Implementations of the present application will now be described, by way of example only, with reference to the attached figures, wherein:

FIG. 8 illustrates a slight perspective view of an anchor in a receiving configuration;

FIG. 10A illustrates a bottom perspective view of an anchor with a movable jaw positioned in a secured configuration.

DETAILED DESCRIPTION

Figure 1:
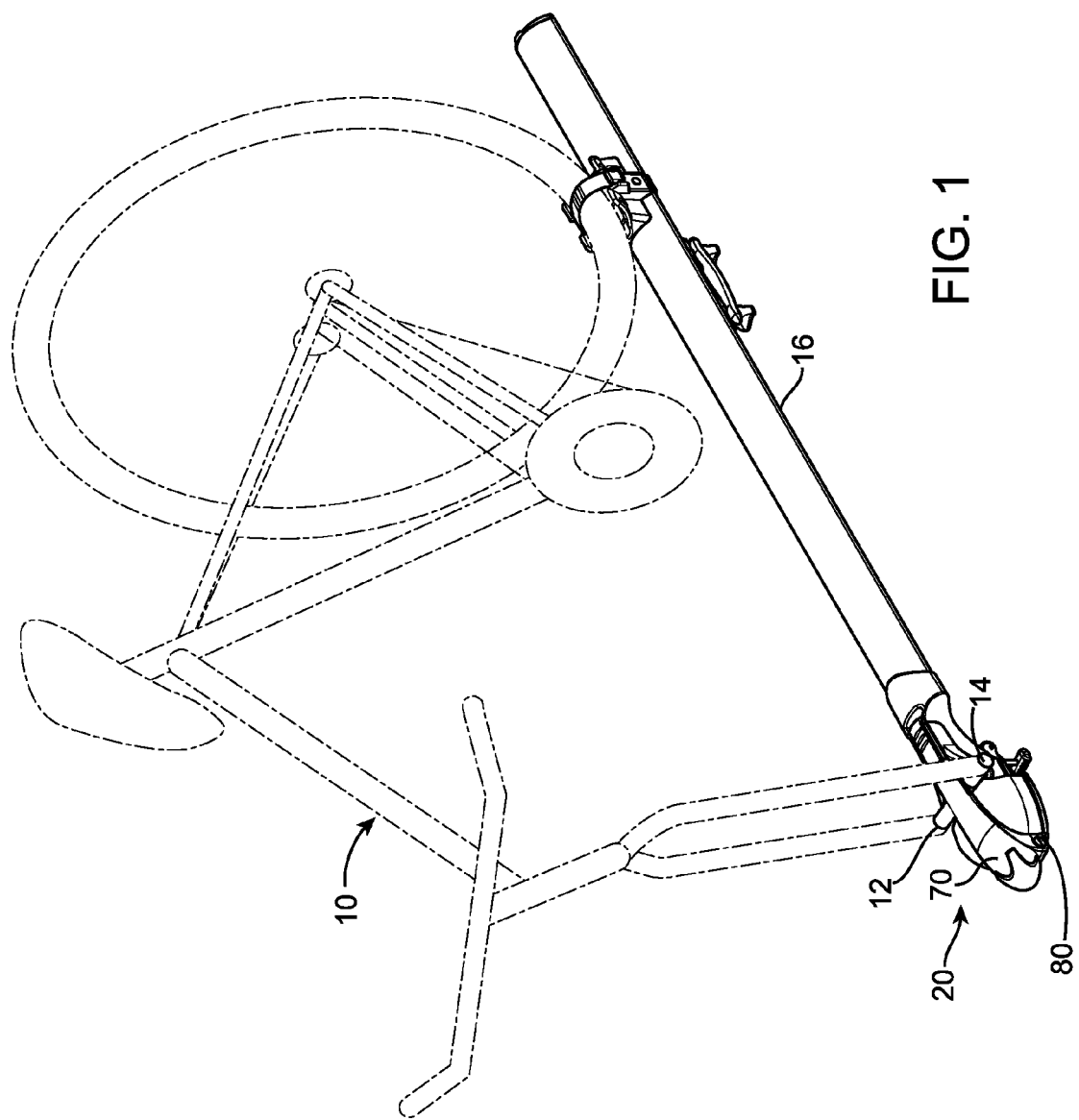
FIG. 1 illustrates a perspective view of one embodiment of a roof mounted bicycle carrier with an anchor.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations and embodiments described herein.

The present disclosure concerns various components that can be implemented and utilized to anchor or secure bicycle wheels of different sizes onto load carriers. Load carriers can include, but are not limited to, load carriers which are mountable onto vehicles such as cars and trucks. At least one way that bicycles can vary in size is that their tires can vary in width and diameter. While the illustrated examples are provided in relation to a bicycle wheel anchor, certain components can be implemented with other devices.

The present disclosure relates to an anchor for releasably securing a bicycle through-axle, that is installed in a wheel-less front fork of a bicycle, to a load carrier. The anchor includes an anchor body having a through-axle receiving space for receiving a bicycle through-axle therein. The anchor also includes a movable jaw, comprising a wedge, located within the anchor body and transitionable between a receiving configuration in which an interior of the receiving space is expanded for insertably receiving a bicycle through-axle therein and a secured configuration in which the movable jaw is in lateral abutting engagement with a bicycle through-axle received within the interior of the receiving space.

In another embodiment, the movable jaw, comprising a wedge, approaches the bicycle through-axle received within the interior of the receiving space from the side, in a substantially horizontal direction, and thereby affects lateral abutting engagement of the movable jaw on the bicycle through-axle. The anchor can further include a through-axle receiving space having a variably configurable interior for receiving different sized bicycle through-axles therein.

The anchor can further include a macro-adjuster located within the anchor body and positioned adjacent to the through-axle receiving space. The macro-adjuster can have a plurality of recessed profiles that each conformance fits to different sized bicycle through-axles when abuttingly engaged thereagainst. The macro-adjuster can also include a recessed profile configured to conformance fit about a portion of a particularly sized bicycle through-axle when abuttingly engaged thereagainst.

The anchor can further include a back-stop located within the anchor body and positioned adjacent to the through-axle receiving space, the back-stop including a mating portion that fits about differently sized bicycle through-axles when abuttingly engaged thereagainst. Additionally, the anchor can include an actuator coupled to the movable jaw that transitions the movable jaw between the receiving and secured configurations and wherein the through-axle receiving space laterally bounds a bicycle through-axle inserted therein when the movable jaw is in the secured configuration.

The anchor can also include a micro-adjuster located within the anchor body and variably adjustable for controlling a press-force exerted on a bicycle through-axle in the secured configuration. The micro-adjuster can be a threaded turnbuckle that extends and retracts upon actuation.

In some embodiments, the actuator includes an adjuster located within the anchor body and variably configurable for varying the size of the interior of the through-axle receiving space. The actuator can have a first lever coupled to the movable jaw that translates the movable jaw between the receiving and secured configurations, and a second lever that abuttingly engages a lever arm of the first lever during actuation. The second lever can form a cover over the through-axle receiving space in a fully actuated configuration of the second lever.

The anchor can also include a lock that releasably secures the second lever over the through-axle receiving space in the fully actuated configuration of the second lever.

In additional embodiments, the first lever is a second order lever having a first lever arm that is journaled to the anchor body at a first end of the first lever and the second lever is a second order lever having a second lever arm that is journaled to the anchor body at a first end of the second lever and the second lever arm abuttingly engages the first lever arm at a mid-point along a length of the second lever arm.

In other embodiments, the actuator has a first lever coupled to the movable jaw that linearly translates the movable jaw slidingly across a support surface of the anchor body between the receiving and secured configurations. The actuator can also include a biasing member acting upon the first lever coupled to the movable jaw and which retracts the movable jaw into the receiving configuration from the secured configuration. In other embodiments, a lever arm of the first lever coupled to the movable jaw includes two arm extensions journaled together whereby the lever arm buckles in an over-center orientation in the secured configuration of the movable jaw thereby holding the movable jaw in the secured configuration until the two arm extensions are transitioned out of the over-center orientation. The actuator can also include a second lever that abuttingly engages the lever arm of the first lever during actuation, the second lever forming a cover over the through-axle receiving space in a fully actuated configuration of the second lever.

In some embodiments, the actuator comprises a compound lever. Further, one lever of the compound lever can be coupled to the movable jaw. The compound lever can include a second order lever. The second order lever can be coupled to the movable jaw. In other embodiments, the second order lever is coupled to the movable jaw by a turnbuckle that is journaled to a lever arm of the second order lever at a first end of the turnbuckle and the turnbuckle is journaled to the movable jaw at a second end of the turnbuckle that is opposite to the first end of the turnbuckle.

The actuator can include a first lever, coupled to the movable jaw, that upon pivotation translates the jaw between the receiving and secured configurations. Additionally, the actuator can include a second lever that abuttingly engages a lever arm of the first lever during actuation, the second lever forming a cover over the through-axle receiving space in a fully actuated configuration of the second lever.

Additionally, in some embodiments, a bicycle through-axle engagement profile on the movable jaw is substantially V-shaped for abuttingly engaging differently sized bicycle through-axles. The anchor can also include a cradle configured to support a bicycle through-axle therein and maintain a bicycle incorporating the bicycle through-axle in an upright position on the anchor.

Figure 2:
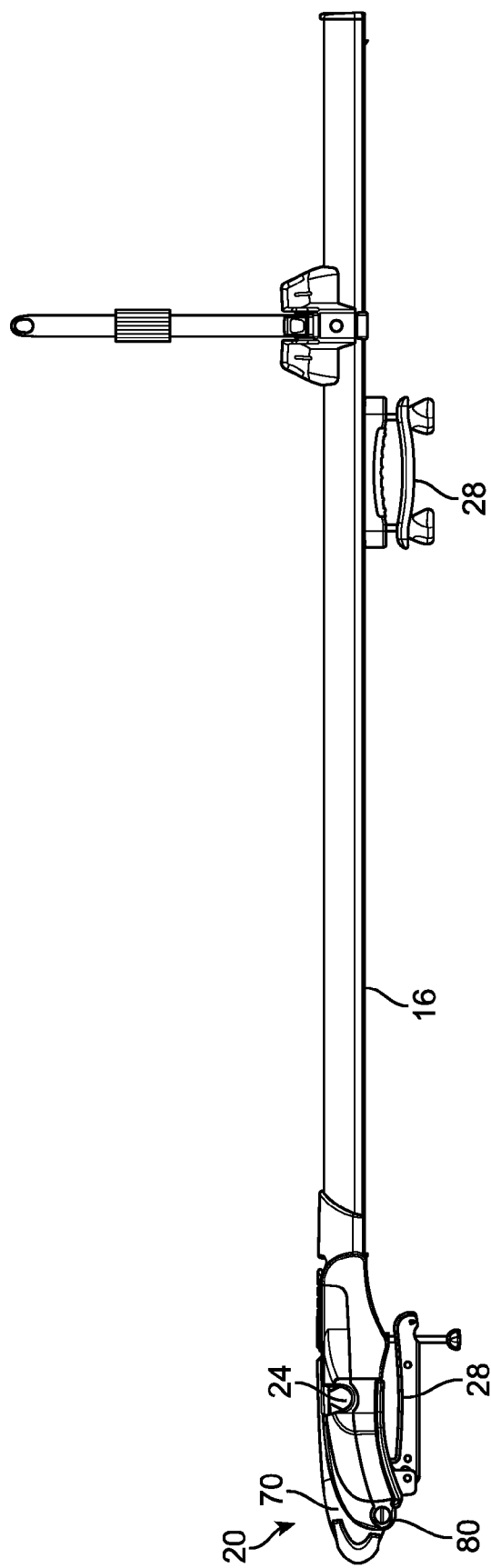
FIG. 2 illustrates a side view of one embodiment of a roof mounted bicycle carrier with an anchor.

Depicted in FIG. 1 is a bicycle 10 mounted to a load carrier 16 by an anchor 20 configured for releasably securing the bicycle through-axle 14 that is installed in the wheelless front fork 12 of the bicycle. FIG. 2 discloses the same load carrier 16 having anchor 20 without a bicycle installed therein. As shown, the anchor 20 includes a through-axle receiving space 24 for receiving a bicycle through-axle therein, as well as brackets 28 for attaching the load carrier to a load bar such as a vehicle cross-bar.

Figure 3:
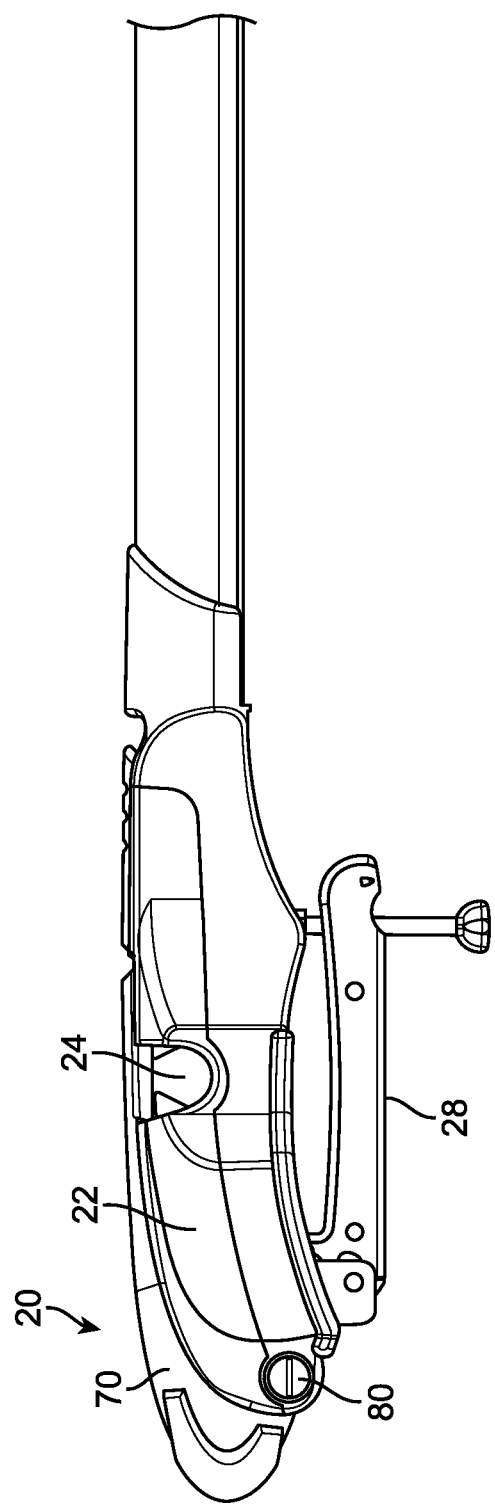
FIG. 3 illustrates a side view of one embodiment of an anchor.
Figure 4:
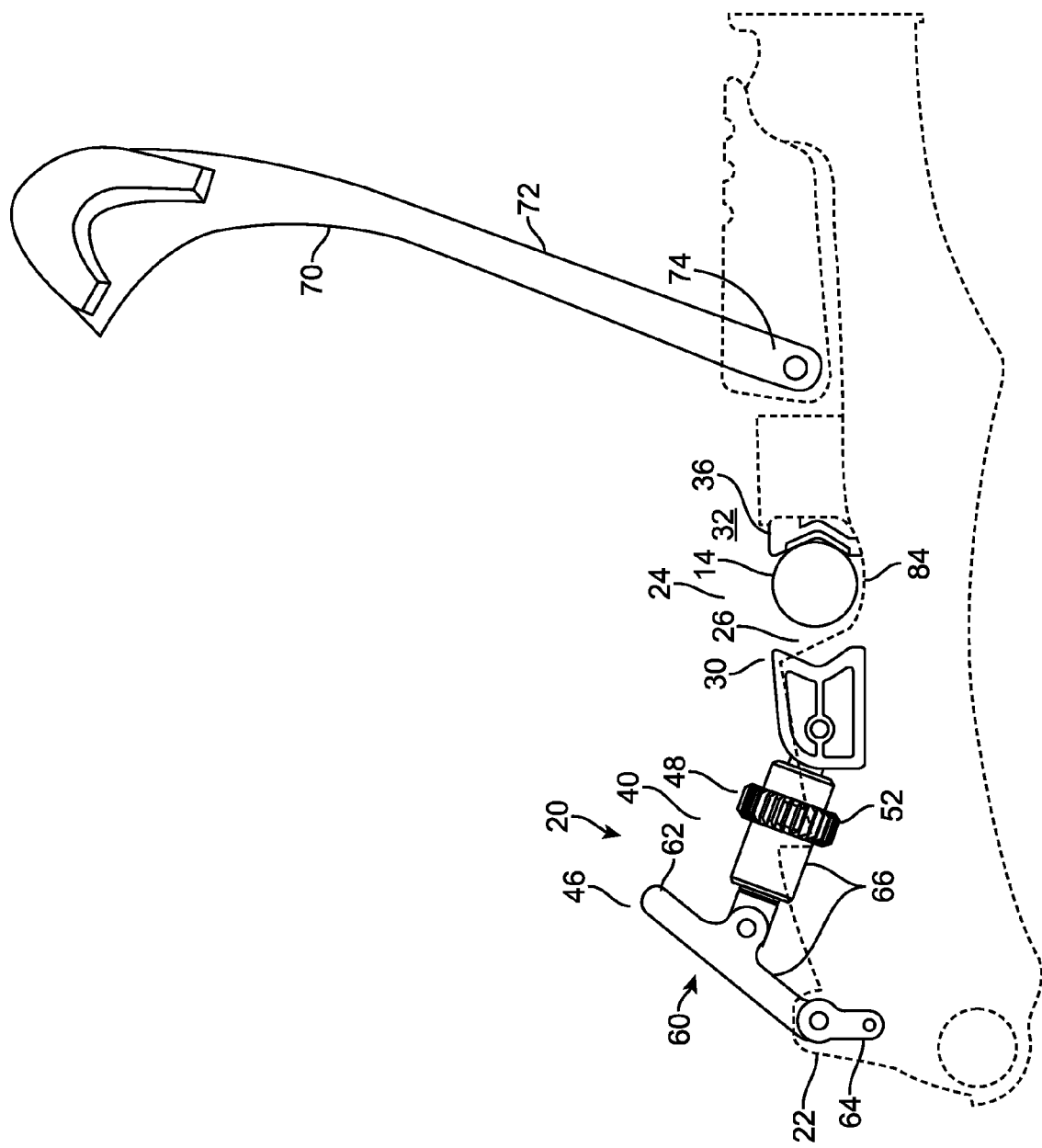
FIG. 4 illustrates a side view of one embodiment of an anchor with a movable jaw positioned in a receiving configuration.

FIG. 3 illustrates one embodiment of the anchor 20. The anchor 20 comprises (includes, but is not limited to) an anchor body 22 comprising a through-axle receiving space 24 for receiving a bicycle through-axle therein. FIG. 4 illustrates one example of the anchor 20 with outer housing removed to show internal components. Shown is a movable jaw 30, comprising a wedge, located within the anchor body 22, which is transitionable between a receiving configuration and a secured configuration. Movable jaw 30 is illustrated in FIG. 4 positioned in a receiving configuration 32 in which an interior 26 of the receiving space 24 is expanded for insertably receiving the bicycle through-axle 14 therein.

Figure 5:
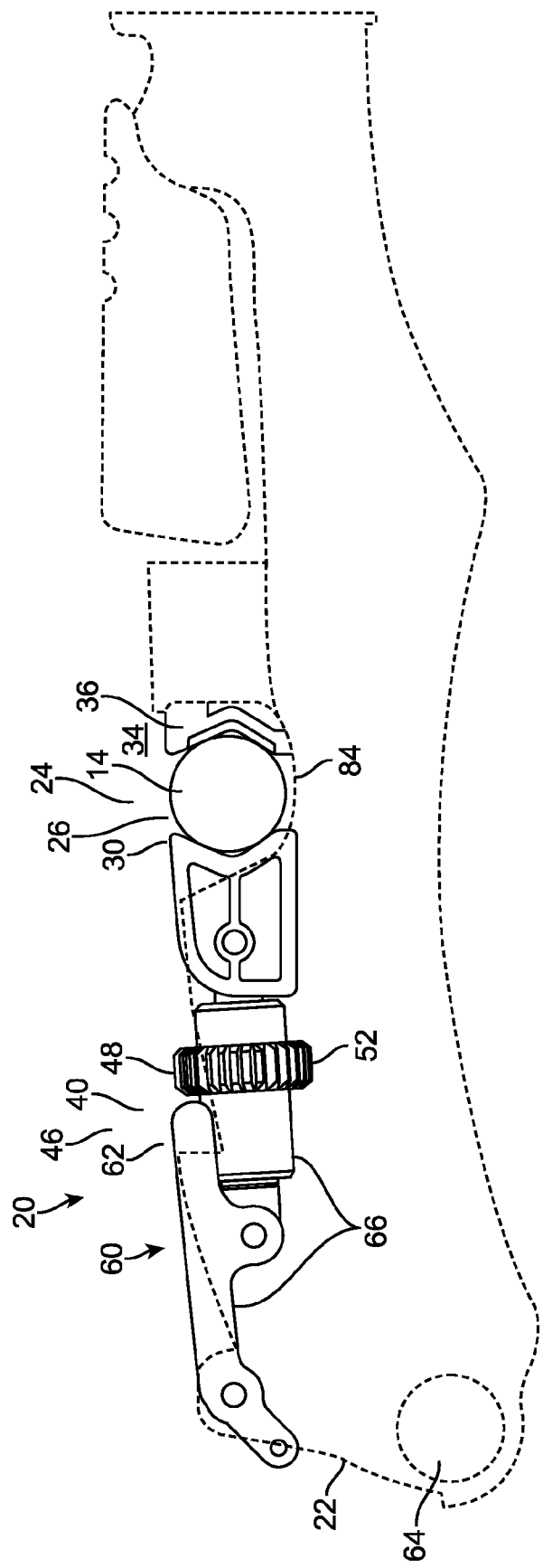
FIG. 5 illustrates a side view of one embodiment of an anchor with a movable jaw positioned in a secured configuration.

FIG. 5 illustrates anchor 20 in a secured configuration 34 in which the movable jaw 30 is in lateral abutting engagement with the bicycle through-axle 14 received within the interior 26 of the receiving space 24. By lateral abutting engagement it is meant that the movable jaw 30 approaches the through-axle 14 from its side when transitioning from the receiving configuration 32 to the secured configuration 34, and ultimately presses thereagainst for trapping the through-axle 14 in the interior 26 of the receiving space 24. That is, the movable jaw 30, including the comprised wedge, approaches the bicycle through-axle 14 received within the interior 26 of the receiving space 24 from its side, in a substantially horizontal direction, and thereby affects abutting engagement of the movable jaw 30 on the bicycle through-axle 14. The wedge, comprising a lower portion of the movable jaw 30, includes a declined surface facing toward the interior (26) of the receiving space (24).

In one embodiment, the through-axle receiving space 24 has a variably configurable interior 26 for receiving different sized bicycle through-axles 14 therein. By variably configurable, it is meant that the interior 26 of the receiving space 24 can be made to have at least different sizes, and potentially other dimensions as well, in the receiving configuration 32. The particular size and/or configuration of the interior 26 of the receiving space 24 depends upon the size (and shape) of the through-axle 14 intended to be installed therein for securement.

In another embodiment, a back-stop 36 is located within the anchor body 22 and positioned adjacent to the through-axle receiving space 24. In one configuration, the back-stop 36 has a mating portion that fits about differently sized bicycle through-axles when abuttingly engaged thereagainst, opposite the movable jaw 30 and included wedge.

Figure 6:
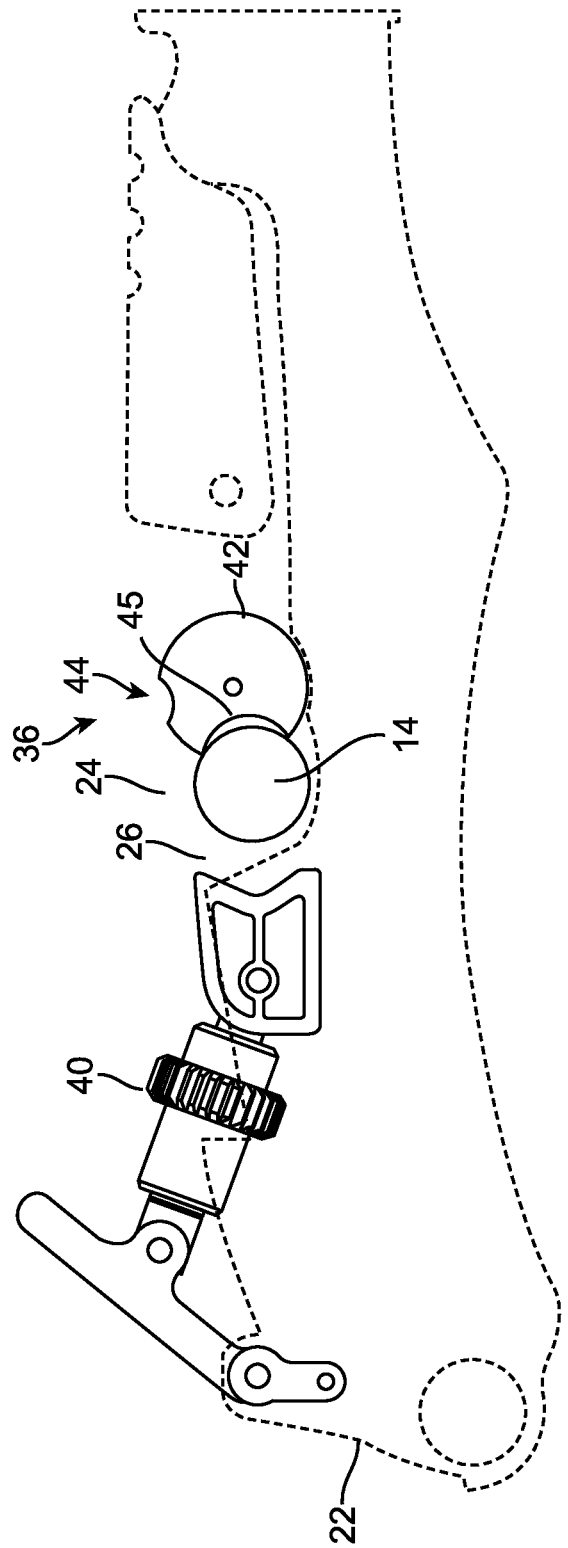
FIG. 6 illustrates a side view of one embodiment of an anchor with a macro-adjustor.
Figure 7:
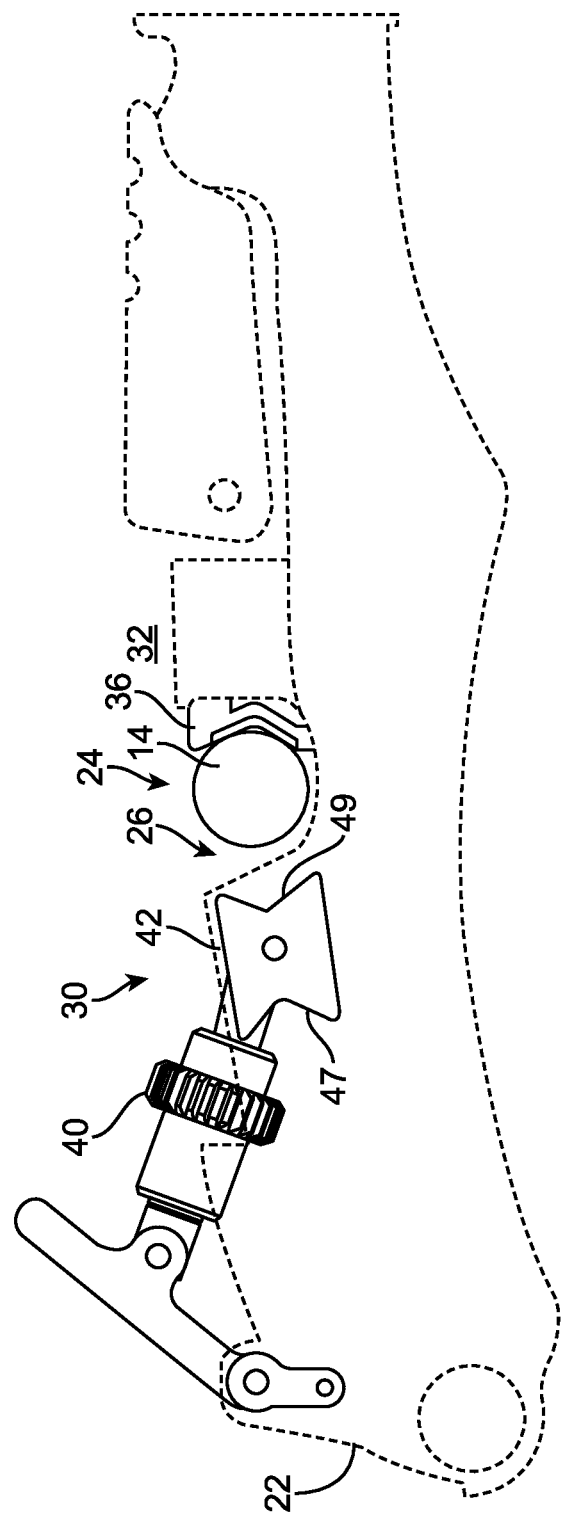
FIG. 7 illustrates a side view of one embodiment of an anchor with a macro-adjustor.

Referring now to FIGS. 6 and 7, these illustrate the employment of a macro-adjustor for conformance fitting different sized bicycle through-axles. FIG. 6 illustrates an anchor 20 wherein back-stop 36 serves as a macro-adjuster 42 located within the anchor body 22 and positioned adjacent to the through-axle receiving space 24 in at least one exemplary embodiment. The macro-adjuster 42 comprises a plurality (two or more) recessed profiles 44 and 45 that each individually conformance fits to different sized bicycle through-axle 14 when abuttingly engaged thereagainst. In one example, the macro-adjuster 42 is a round, rotatable disk is provided with different sized recesses located about its perimeter. Each recess is semi-circular with a diameter approximately equal to that of the through-axle 14 against which it is intended to abut. The disc can be rotated into different positions directing the particular recess toward the interior 26 of the receiving space 24 that is sized to mate with the intended through-axle 14.

FIG. 7 illustrates an alternative embodiment of an anchor 20 wherein movable jaw 30 serves as a macro-adjuster 43 located within the anchor body 22 adjacent to the through-axle receiving space 24. The macro-adjuster 43 comprises a plurality (two or more) recessed profiles 47 and 49 that each individually conformance fits to different sized bicycle through-axle 14 when abuttingly engaged thereagainst. The macro-adjuster 43 is rotatable to provide different sized recess located about its perimeter for abutment against different sized bicycle through-axle 14. Each recess is semi-circular with a diameter approximately equal to that of the through-axle 14 against which it is intended to abut. The disc can be rotated into different positions directing the particular recess toward the interior 26 of the receiving space 24 that is sized to mate with the intended through-axle 14.

Returning now to FIGS. 4 and 5, an actuator 46 is coupled to (interconnected with, but not necessarily directly) the movable jaw 30 that transitions the movable jaw 30 between the receiving 32 and secured 34 configurations. The through-axle receiving space 26 laterally bounds any bicycle through-axle 14 inserted therein when the movable jaw 30 is in the secured configuration 34. By "laterally bound" it is meant that sidewalls of the receiving space 26 are at least as tall as the through-axle 14 received therein in both the receiving 32 and securing 34 configurations. It is possible, however, that the receiving space 24 can be open above the received through-axle 14.

An adjuster 40 is located within the anchor body 22 and is variably configurable for varying the size of the interior 26 of the through-axle receiving space 24.

In at least one embodiment, the actuator 46 includes a micro-adjuster 48 located within the anchor body 22 and which is variably adjustable for controlling a press-force exerted on a bicycle through-axle 14 in the secured configuration.

Exemplarily, the micro-adjuster 48 is a threaded turnbuckle 52 that extends and retracts upon actuation.

In at least one embodiment, the actuator 46 comprises a first lever 60 coupled to the movable jaw 30 that translates the movable jaw 30 between the receiving 32 and secured 34 configurations. A second lever 70 abuttingly engages a lever arm 62 of the first lever 60 during actuation and the second lever 70 forms a cover over the through-axle receiving space 24 in a fully actuated configuration of the second lever 70.

Figure 8A:
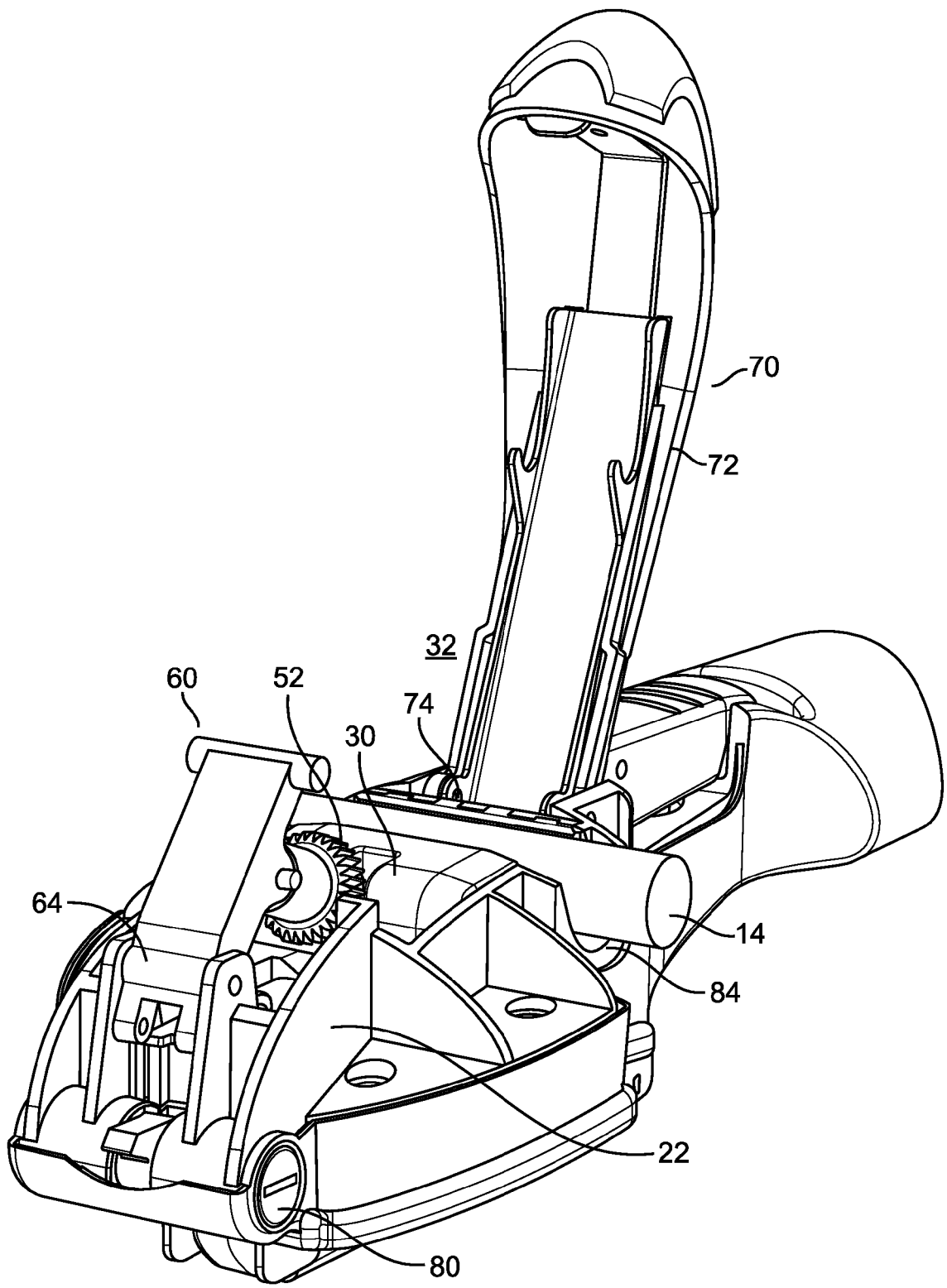
FIG. 8A illustrates a perspective view of an anchor in a receiving configuration.
Figure 8B:
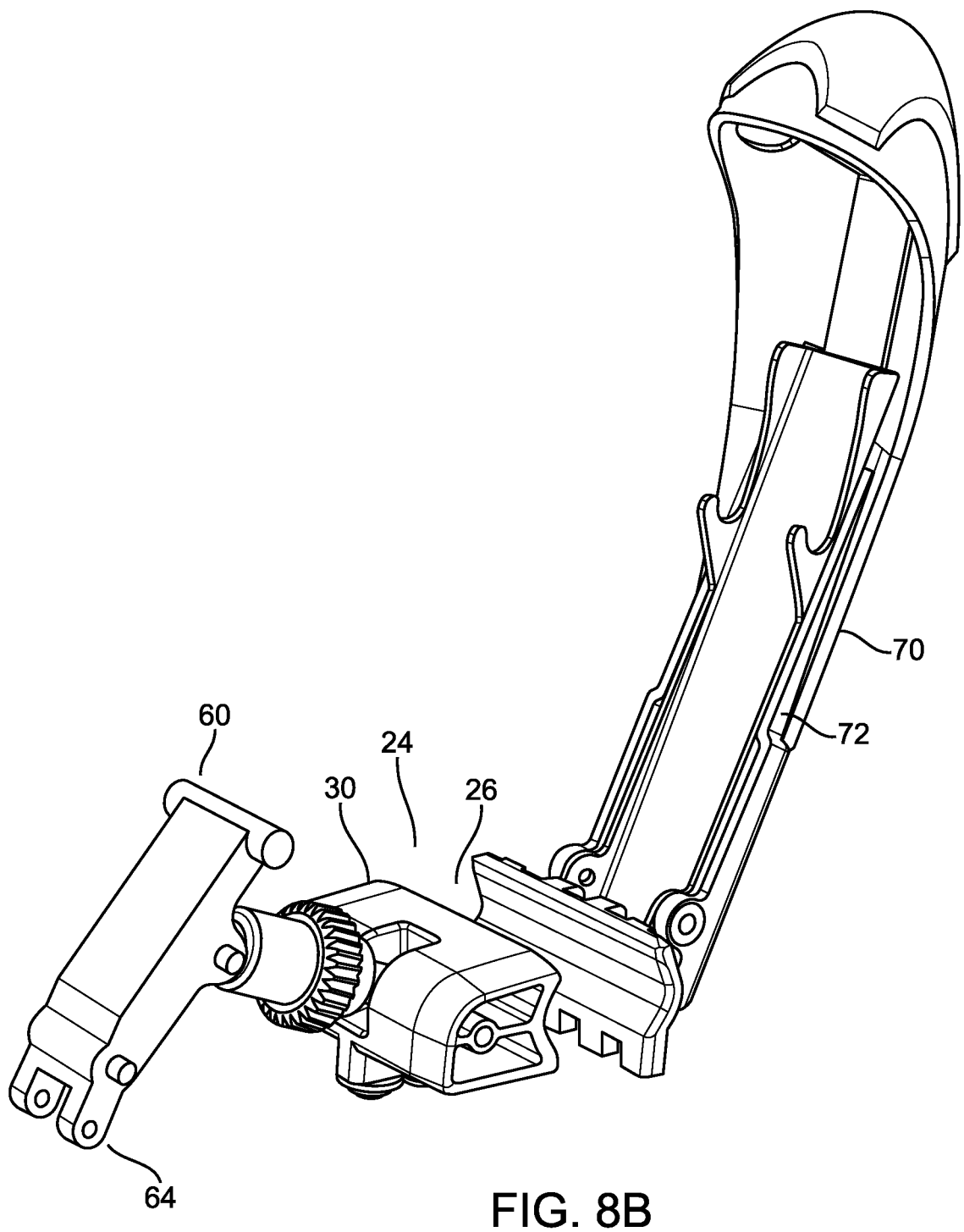
FIG. 8B illustrates a perspective view of an anchor in a receiving configuration.
Figure 9:
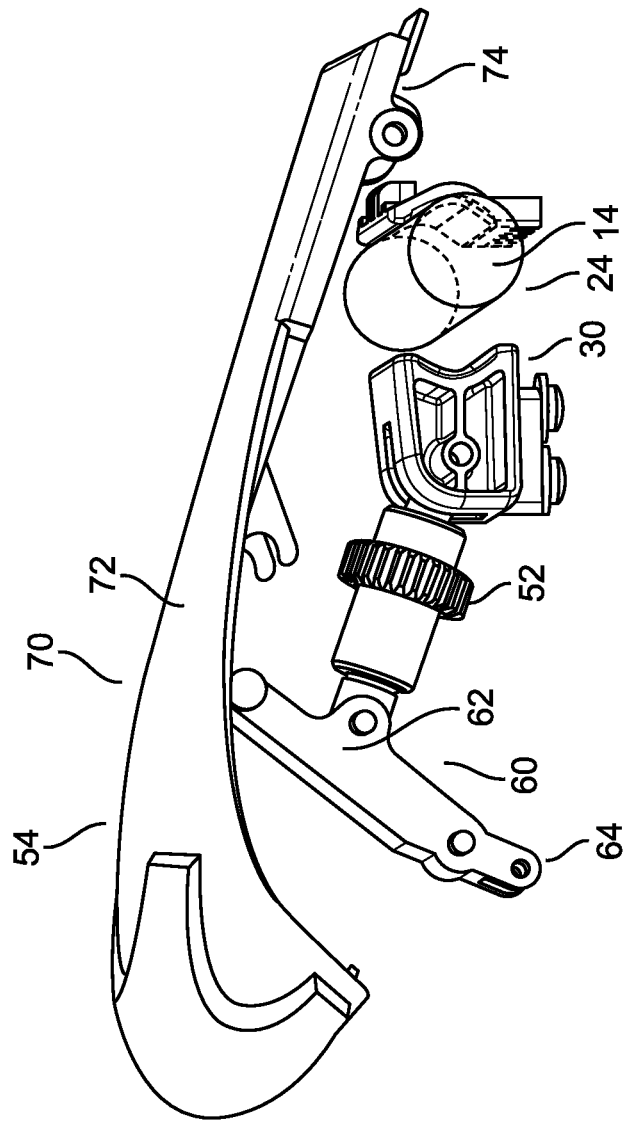
FIG. 9 illustrates a slight perspective view of an anchor with a second lever abuttingly engaging a lever arm.
Figure 10:
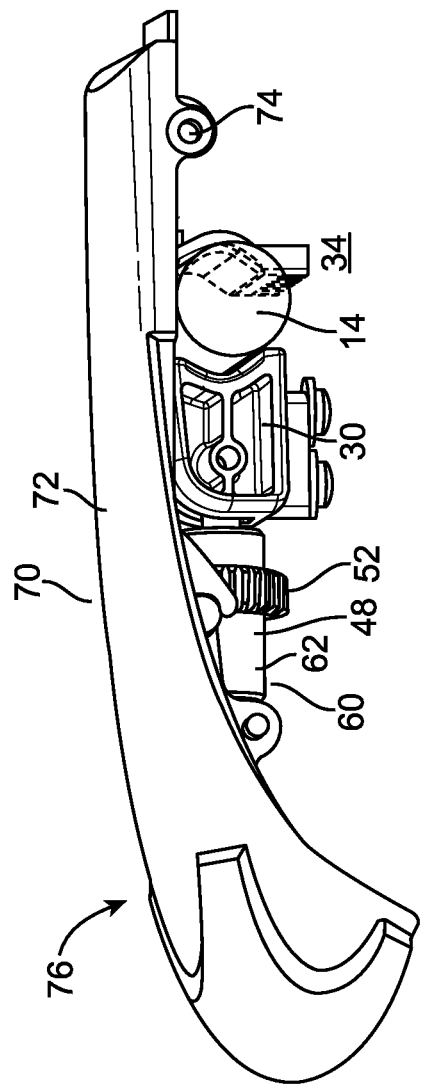
FIG. 10 illustrates a side view of an anchor with a movable jaw positioned in a secured configuration.

This actuation of the second lever 70 is exemplified for example in FIGS. 8-10. FIG. 8 illustrates second lever 70 in a raised position, and where the moveable jaw 30 is in the receiving configuration 32. FIG. 8A illustrates a perspective view of the anchor 20 with the second lever 70 in the same position as in FIG. 8 but with body 22. FIG. 8B illustrates the same in a perspective view, and with body 22 invisible. FIG. 9 illustrates second lever 70 abuttingly engaging the lever arm 62 midway along second lever 70. Accordingly, a motive force is applied to the lever arm 62 by second lever 70. With continued application of force, the first lever 60 translates the movable jaw 30 to the secured configuration 34, as shown in FIG. 10. The second lever 70 forms a cover over the through-axle receiving space 24. FIG. 10A illustrates the same secured configuration with lever 70 acting as a cover but with a perspective view from a vantage point below the anchor 20.

Still further, in order to avoid unauthorized disengagement of a secured bicycle 10 from the anchor 20, a lock 80 (e.g. shown in FIG. 2) can be provided that retains the movable jaw 30 in the secured configuration 34 until the lock 80 is unlocked for authorized release of the bicycle through-axle 14 and dismount of the bicycle 10 from the incorporating load carrier 16.

In at least one embodiment, the lock 80 releasably secures the second lever 70 over the through-axle receiving space 24 in the fully actuated configuration of the second lever 70.

In one example, the first lever 60 is a second order lever having a first lever arm 62 that is journaled to the anchor body 22 at a first end 64 of the first lever 60. In a second order lever, the fulcrum is located at one end of the lever arm, the motive force is applied at the other end of the arm and the load to be moved or otherwise urged engages the arm therebetween. Similarly, the second lever 70 is a second order lever having a second lever arm 72 that is journaled to the anchor body 22 at a first end 74 of the second lever 70. The second lever arm 72 abuttingly engages the first lever arm 62 at a mid-point (mid-range) along a length of the second lever arm 72.

In at least one embodiment, the actuator 46 comprises a first lever 60 coupled to the movable jaw 30 that linearly translates the movable jaw 30 across a support surface between the receiving 32 and secured 34 configurations. Exemplarily, the actuator comprises a biasing member acting upon the first lever 60 coupled to the movable jaw 30 and which retracts the movable jaw 30 into the receiving configuration 32 from the secured configuration 34.

In another embodiment, a first lever arm 62 of the first lever 60 coupled to the movable jaw 30 comprises two arm extensions 66 journaled together and configured so that the lever arm 62 buckles in an over-center orientation in the secured configuration 34 of the movable jaw 30 thereby holding the movable jaw 30 in the secured configuration 34 until the two arm extensions 66 are transitioned out of the over-center orientation.

The actuator 46 can also include a second lever 70 that abuttingly engages the lever arm 62 of the first lever 60 during actuation, the second lever 70 forming a cover 76 over the through-axle receiving space 24 in a fully actuated configuration of the second lever 70.

In at least one example, the actuator 46 comprises a compound lever 54 that includes a first lever 60 and a second lever 70, illustrated in FIG. 9. One lever 60 of the compound lever 54 is coupled to the movable jaw 30. At least one of the levers 60, 70 is a second order lever and that lever is coupled to the movable jaw 30. Exemplarily, the second order lever is coupled to the movable jaw 30 by a turnbuckle 52 (threaded) that is journaled to a lever arm 62 of the second order lever at a first end of the turnbuckle 52 and the turnbuckle 52 is journaled to the movable jaw 30 at a second end of the turnbuckle 52 that is opposite to the first end of the turnbuckle 52.

In another embodiment, the actuator 46 comprises a first lever 60, coupled to the movable jaw 30, that upon pivotation translates the jaw 30 between the receiving 32 and secured 34 configurations. Exemplarily, the actuator 46 comprises a second lever 70 that abuttingly engages a lever arm 62 of the first lever 60 during actuation and the second lever 70 forms a cover 76 over the through-axle receiving space 24 in a fully actuated configuration of the second lever 70.

In one embodiment, illustrated for example in FIGS. 4 and 5, a bicycle through-axle engagement profile 31 on the movable jaw 30 is substantially V-shaped for abuttingly engaging differently sized bicycle through-axles 14. As depicted, the lower portion of the V-shaped movable jaw 30 comprises a movable wedge having a declining surface facing the interior 26 of the receiving space 24 for abutment with a bicycle through-axle 14.

In at least one exemplary embodiment, illustrated for example in FIGS. 4 and 5, a cradle 84 is provided on the anchor 20 that is configured to support a bicycle through-axle 14 therein and maintain a bicycle 10 incorporating the bicycle through-axle 14 in an upright position on the anchor 20.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. An anchor for releasably securing a bicycle through-axle, that is installed in a wheelless front fork of a bicycle, to a load carrier, the anchor comprising:
   an anchor body comprising a through-axle receiving space configured to receive a bicycle front fork through-axle therein; and
   a movable wedge located within the anchor body and transitionable between a receiving configuration in which an interior of the receiving space is expanded for insertably receiving a bicycle through-axle therein and a secured configuration in which the movable wedge is in abutting engagement with the bicycle front fork through-axle received within the interior of the receiving space,
   wherein an actuator coupled to the movable wedge linearly translates the movable wedge slidingly across a support surface of the anchor body between the receiving and secured configurations.

2. The anchor of claim 1, wherein the movable wedge approaches the bicycle through-axle received within the interior of the receiving space from the side, in a substantially horizontal direction, and thereby affects abutting engagement of the movable wedge on the bicycle through-axle.

3. The anchor of claim 1, further comprising the through-axle receiving space having a variably configurable interior for receiving different sized bicycle through-axles therein.

4. The anchor of claim 3, further comprising:
   a back-stop located within the anchor body and positioned adjacent to the through-axle receiving space for abutting engagement with the bicycle through-axles opposite the movable wedge.

5. The anchor of claim 3, further comprising:
   a macro-adjuster located within the anchor body and positioned adjacent to the through-axle receiving space, the macro-adjuster comprising a recessed profile configured to conformance fit about a portion of a particularly sized bicycle through-axle when abuttingly engaged thereagainst.

6. The anchor of claim 1, further comprising:
   a back-stop positioned adjacent to the through-axle receiving space, the back-stop comprising a mating portion that fits about differently sized bicycle through-axles when abuttingly engaged thereagainst.

7. The anchor of claim 1,
   wherein the through-axle receiving space laterally bounds the bicycle through-axle inserted therein when the movable wedge is in the secured configuration.

8. The anchor of claim 1, wherein the actuator comprises:
   a micro-adjuster located within the anchor body and variably adjustable for controlling a press-force exerted on a bicycle through-axle in the secured configuration.

9. The anchor of claim 8, wherein the micro-adjuster is a threaded turnbuckle that extends and retracts upon actuation.

10. The anchor of claim 1, wherein the actuator comprises:
    a micro-adjuster variably configurable for varying the size of the interior of the through-axle receiving space.

11. The anchor of claim 1, wherein the actuator comprises:
    a lever coupled to the movable wedge that translates the movable wedge between the receiving and secured configurations and the lever forms a cover over the through-axle receiving space in a fully actuated configuration of the lever.

12. The anchor of claim 11, further comprising a lock that releasably secures the lever over the through-axle receiving space in the fully actuated configuration of the lever.

13. The anchor of claim 1, wherein the actuator comprises a biasing member coupled to the movable wedge and which retracts the movable wedge into the receiving configuration from the secured configuration.

14. The anchor of claim 1, wherein the actuator comprises a lever.

15. The anchor of claim 14, wherein the lever is coupled to the movable wedge.

16. The anchor of claim 1, wherein the actuator comprises a lever, coupled to the movable wedge, that upon pivotation, translates the wedge between the receiving and secured configurations.

17. The anchor of claim 1, wherein a bicycle through-axle engagement profile on the movable wedge is substantially V-shaped for abuttingly engaging differently sized bicycle through-axles.

18. The anchor of claim 1, further comprising a cradle configured to support the bicycle through-axle therein and maintain a bicycle incorporating the bicycle through-axle in an upright position on the anchor.

19. The anchor of claim 1, wherein the movable wedge comprises a declined surface facing toward the interior of the receiving space.

20. An anchor configured to releasably secure a bicycle front fork through-axle to a load carrier, the anchor comprising:
    an anchor body comprising:
       a housing; and
       a through-axle receiving space defined within the housing and configured to receive the bicycle front fork through-axle therein;
    a movable wedge disposed within the housing and configured to transition between a receiving configuration, wherein the through-axle receiving space is expanded for insertably receiving the bicycle front fork through-axle therein, and a secured configuration, wherein the movable wedge abuts the bicycle front fork through-axle received within the receiving space; and
    an actuator coupled to the movable wedge configured to linearly translate the movable wedge across a support surface of the housing between the receiving and secured configurations.

21. The anchor of claim 20, wherein the housing comprises a cover hingedly connected to the anchor body.

22. The anchor of claim 21, wherein the actuator comprises a first lever and the cover comprises a second lever, wherein closing the cover engages the actuator, thereby translating the movable wedge from the receiving configuration to the secured configuration and enclosing the through-axle receiving space within the housing.

* * * * *